No. 732,616. PATENTED JUNE 30, 1903.
C. F. BURGESS & C. HAMBUECHEN.
METHOD OF APPLYING HEAT TO ELECTROLYTES.
APPLICATION FILED MAR. 12, 1903.
NO MODEL.
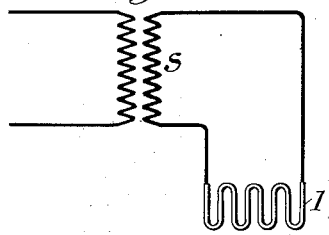
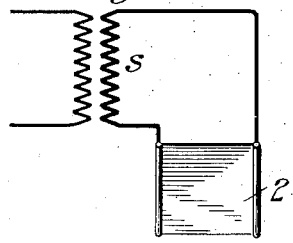
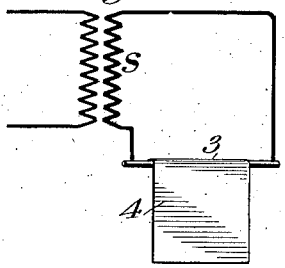
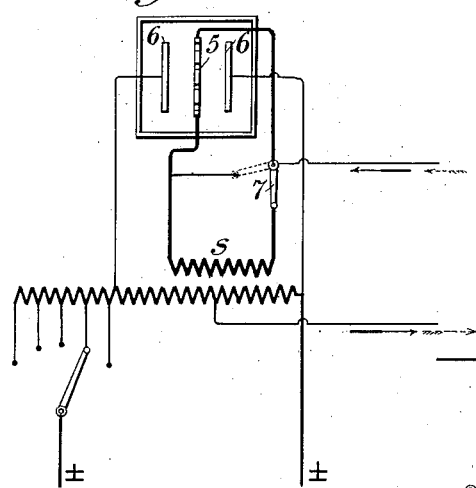
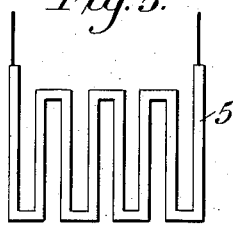
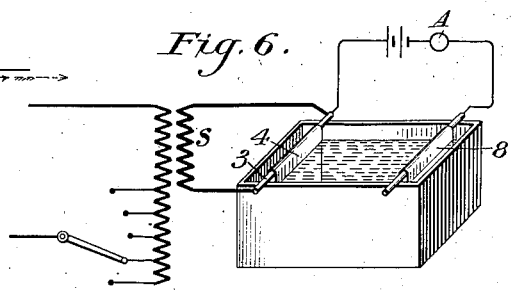
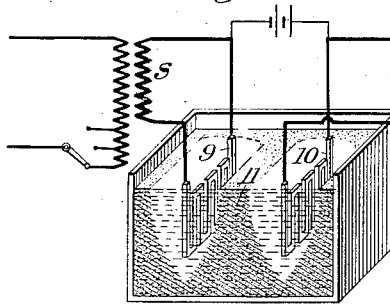
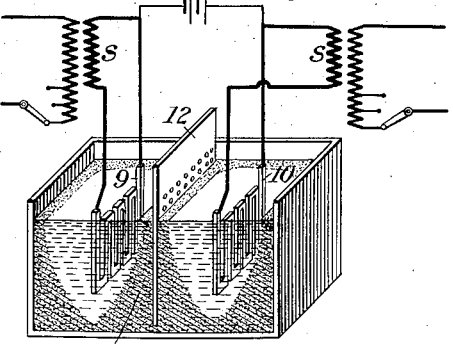
Witnesses:
R. A. Balderson,
Harry C. Robb.
Inventors:
Charles F. Burgess,
Carl Hambuechen,
By Byrnes Townsend,
Attys.

No. 732,616. Patented June 30, 1903.

UNITED STATES PATENT OFFICE.

CHARLES FREDERICK BURGESS AND CARL HAMBUECHEN, OF MADISON, WISCONSIN.

METHOD OF APPLYING HEAT TO ELECTROLYTES.

SPECIFICATION forming part of Letters Patent No. 732,616, dated June 30, 1903.

Application filed March 12, 1903. Serial No. 147,460. (No model.)

*To all whom it may concern:*

Be it known that we, CHARLES FREDERICK BURGESS and CARL HAMBUECHEN, citizens of the United States, residing at Madison, in the county of Dane and State of Wisconsin, have invented certain new and useful Improvements in Methods of Applying Heat to Electrolytes, of which the following is a specification.

This invention is a method of applying heat to electrolytes or to the products separated therefrom by electrolysis and is designed to accord with the well-known fact that there is an enormous difference between the specific conductivities of metallic and electrolytic conductors.

According to our invention the heating of the electrolytic conductor or the separated product is accomplished by passing a low-voltage current, which may be either direct or alternating, through a conductor of the first class, said conductor constituting one of the terminals of the electrolyzing-circuit or being in contact with such terminal.

Referring to the accompanying drawings, Figures 1, 2, 3 are diagrams representing several methods of applying our invention. Figs. 4, 5 illustrate the application of our invention to an electrolytic cell or asymmetric conductor. Fig. 6 shows one mode of applying our invention, said mode being particularly applicable to aqueous solutions; and Figs. 7 and 8 illustrate a specific application of our principle to molten electrolytes.

It is often advantageous or even essential in conducting electrolytic operations, both in aqueous and molten electrolytes, to apply heat to a particular locality or portion of the cell, and especially to one or both of the electrodes, or to maintain during electrolysis certain definite differences of temperature within the cell. Heretofore this has been accomplished by several methods, among which may be mentioned a local application of heat to the exterior of the vessel, the use of a high-current density at one or the other electrode, the local heating or cooling of an electrode, and the use of electrodes of high resistance, whereby the bath is locally heated by a portion of the electrolyzing-current.

Our invention is distinguished from those above mentioned by the fact that one or both of the electrodes is employed as a heater, being connected for this purpose in a circuit which is independent of the electrolyzing-circuit and which is preferably alternating. The pressure of the heating-circuit should preferably not exceed five to ten volts for good conducting-electrolytes, although a higher pressure may be used with electrolytes of relatively high specific resistance. The heating-current may be derived from storage-cells, a low-pressure dynamo, or, preferably, from the low-pressure secondary of a transformer. For convenience of illustration the latter method is indicated in each of the figures.

Fig. 1 shows a heating-conductor 1, consisting of a wire or bar wound or bent in zig-zag form, the current from the low-pressure secondary $s$ of a transformer passing therethrough from end to end. In use said wire or bar is connected as a terminal of the electrolyzing-circuit. Fig. 2 shows a plate-electrode 2, which may be of any conductive material arranged to be heated by the passage of a suitable current through it from side to side. In Fig. 3 the heat is primarily developed in a bar or rod 3, which may be of metal or carbon or any conducting material suited to the current employed. The heat so developed is transferred by conduction from said bar to the plate-electrode 4, which is supported by or contacts with said bar. These several forms are illustrated merely as typical methods of applying our invention.

In Fig. 4 we have illustrated one manner of applying our invention to an asymmetric conductor of the electrolytic-cell type, said asymmetric conductor having an electrolyte which is solid and non-conducting, or nearly so, at ordinary temperatures, as more fully set forth in the application of Carl Hambuechen, Serial No. 139,614, filed January 19, 1903, and circuit connections being provided whereby a rectified current may be obtained in one of the branches when an alternating pressure is applied to the extreme terminals, as more fully described in the application of Chas. F. Burgess, Serial No. 147,461, filed March 12, 1903. In this construction the intermediate electrode 5, which may be of iron and situated between electrodes 6, 6 of aluminium, is connected in circuit with the secondary $s$ of a low-pressure transformer, whereby an alternating current may be passed through the electrode and the bath brought into a molten or conductive condition. A switch 7 is provided in said circuit whereby the heating-current may be cut off after the electrolyte has become conductive and the normal operation is begun, the heat losses in the cell being thereafter generally sufficient to maintain the electrolyte at the desired temperature. During the heating the switch 7 is in the position indicated by full lines, the intermediate electrode 5 then serving both as electrode and heater. After the bath has become conductive the switch 7 may be moved into the position indicated by the dotted lines, thereby disconnecting the secondary $s$. In this position the intermediate electrode acts simply as an electrode.

Fig. 6 illustrates an electrolytic vat provided with means for imparting heat to the cathode 4 and to the product separated thereon, said means being substantially similar to those above described in connection with Fig. 3. This arrangement is particularly suited to the separation of metals from aqueous solutions.

Figs. 7, 8 show a fused electrolyte provided with two electrodes 9 10 and means for imparting heat to both. This construction will be described with reference to a specific method of producing metallic sodium by the electrolysis of fused caustic soda, it being understood, however, that such use is described by way of example only. For this particular purpose we have found it desirable that the electrolyte be maintained at a higher temperature around the anode than around the cathode, the temperature in the region of the cathode being maintained at such value that the sodium will rise readily to the surface and preferably but little above the melting-point of the caustic. The electrodes 9 10 are both provided with appropriate circuit connections and are so formed as to admit of being readily heated by the low-pressure alternating current derived from the secondaries $s$ $s$ of independent transformers. Said heated electrodes are employed first for bringing the electrolyte into a molten condition and thereafter for so regulating the temperature of the same as to secure the best results.

The temperature may be so regulated by means of our invention as to maintain in a fused electrolyte between the electrodes a semisolid though conducting diaphragm having the composition of the remainder of the electrolyte, said diaphragm constituting an efficient separator for the products of the electrolysis. A diaphragm of this character is indicated at 11 in Figs. 7 and 8. The formation and maintenance of such diaphragm may be facilitated by conducting the heat from this portion of the bath by suitable means—such, for instance, as a metal plate 12, Fig. 8, said plate being preferably perforated or otherwise formed to permit passage of the current. Said plate may consist of any metallic or other good conductor of heat not injuriously affected by electrolyte.

Our method will be found useful in many relations in addition to those mentioned. For instance, it may be employed in all deposition processes wherein the character of the deposited metal depends upon the temperature at the cathode or in processes wherein the corrosion of the anode is influenced by the temperature. It is also useful in electrolytic processes where such metals as calcium, barium, strontium, and magnesium are to be recovered, the requisite conditions for obtaining these metals being a moderate heat throughout the electrolyte and a high temperature at the cathode. Our invention enables the temperature in all cases to be accurately regulated. Our method can also be used with advantage in regulating the oxidizing and the reducing processes at the electrodes in organic work, as experiments have demonstrated.

The expression "imparting heat to one or more of the terminals by including the same in an electric circuit distinct from the electrolyzing-circuit" as herein employed is intended to include both the construction shown in Figs. 1, 2, 4, 5, 7, 8, wherein one or both electrodes or any portion thereof is directly included in the heating-circuit, and also the construction shown in Figs. 3, 6, wherein any portion of the terminal in physical and electrical contact with the electrode is so included and the heat transmitted therefrom to the electrode.

We claim—

1. The method of applying heat to electrolytes which consists in imparting heat to one or more of the terminals by including the same in an electric circuit distinct from the electrolyzing-circuit, as set forth.

2. The method of applying heat to electrolytes, which consists in imparting heat to one or more of the electrodes by including the same in an electric circuit distinct from the electrolyzing-circuit, as set forth.

3. The method of applying heat to electrolytes, which consists in imparting heat to one or more of the electrodes by including the same in an alternating circuit, as set forth.

4. The method of applying heat to electrolytes, which consists in imparting heat to one or more of the electrodes by including the same in a low-pressure electric circuit, as set forth.

5. The method of applying heat to electrolytes, which consists in imparting heat to one or more of the electrodes by including the same in a low-pressure alternating circuit, as set forth.

6. The method of applying heat to electrolytes, which consists in imparting heat to the anode by including the same in an electric circuit distinct from the electrolyzing-circuit, as set forth.

7. The method of applying heat to electrolytes which are substantially non-conductive at ordinary temperatures, which consists in imparting heat to one or more of the electrodes by including the same in an electric circuit distinct from the electrolyzing-circuit, as set forth.

8. The method of applying heat to electrolytes which are substantially non-conductive at ordinary temperatures, which consists in providing in contact therewith electrodes of such character that the current passes more readily in one direction than in the other, and imparting heat to one or more of said electrodes by including it in a separate electric circuit, as set forth.

9. The method of applying heat to electrolytes which are substantially non-conductive at ordinary temperatures, which consists in providing in contact therewith electrodes of aluminium and iron, and imparting heat to the iron electrode by means of a separate electric circuit, as set forth.

10. The method which consists in providing in contact with substances which are substantially non-conductive at ordinary temperatures, electrodes of aluminium and iron, imparting heat to the iron electrode by means of a separate electric circuit, and applying alternating pressure to said electrodes, as set forth.

In testimony whereof we affix our signatures in presence of two witnesses.

CHARLES FREDERICK BURGESS.
CARL HAMBUECHEN.

Witnesses:
W. L. HIESTAND,
CHAS. S. SLICHTER.